United States Patent [19]

Reid

[11] 3,864,431

[45] Feb. 4, 1975

[54] STABILIZED POLYOLEFINS USEFUL AS WIRE INSULATION IN PETROLEUM-JELLY FILLED CABLES

[75] Inventor: Donald E. Reid, Newark, Del.

[73] Assignee: Hercules Incorporated, Wilmington, Del.

[22] Filed: Oct. 12, 1973

[21] Appl. No.: 406,070

Related U.S. Application Data

[62] Division of Ser. No. 254,553, May 18, 1972, Pat. No. 3,798,286.

[52] U.S. Cl........ 260/897 R, 260/45.85 S, 260/873, 260/847 R, 260/848, 178/15
[51] Int. Cl. ............................................ C08f 29/12
[58] Field of Search...................... 260/897, 45.85 S

[56] References Cited
UNITED STATES PATENTS 3,564,076   2/1971   Kauder .............................. 260/870
3,629,189   12/1971   Minagawa et al..................... 260/23

FOREIGN PATENTS OR APPLICATIONS 866,891   5/1961   Great Britain ...................... 260/897

Primary Examiner—Murray Tillman
Assistant Examiner—C. J. Seccuro
Attorney, Agent, or Firm—Edith A. Rice; Edwin H. Dafter, Jr.

[57] ABSTRACT

Polyolefins useful for insulating wire for use in petroleum jelly-filled cables are stabilized by a combination of additives including a phenolic antioxidant, a polymeric ester of a thiodialkanoic acid and an inhibitor against copper induced degradation.

4 Claims, No Drawings

STABILIZED POLYOLEFINS USEFUL AS WIRE INSULATION IN PETROLEUM-JELLY FILLED CABLES

This is a division of application Ser. No. 254,553, filed May 18, 1972, now U.S. Pat. No. 3,798,286.

This invention relates to a novel composition comprising a polyolefin having incorporated therein a combination of additives which render the polymer especially useful for insulating wire that is to be employed in petroleum jelly-filled cables.

It is known to use high density polyethylene and crystalline polymers of propylene as insulation for metallic wires, a plurality of such wires often being assembled together to form a cable. In the telephone industry it has become desirable in recent time to fill the interstices between individual wires in a buried telephone cable with petroleum jelly in order to keep water out of the cable.

The problem in using the aforesaid polymers as insulation in petroleum jelly-filled telephone cables is twofold. First, the copper of which the wire is normally made induces degradation of the polymer. Secondly, the petroleum jelly surrounding the insulated wire tends to extract stabilizers from the polymer and thus further increase its normal tendency to degrade.

The present invention is concerned with stabilization of high density polyethylene and crystalline polymers of propylene in order to increase the stability of such polymers to a satisfactory level when they are used as insulation in petroleulm jelly-filled telephone cable. In accordance with the invention it has been discovered that high density polyethylene or a crystalline polymer of propylene stabilized with the following combination of additives:

A. A phenolic antioxidant which is either
  1. a resinous condensation product of a terpene and phenol, having a molecular weight of at least 400, or
  2. an A-stage condensation product of a para-substituted alkylphenol and an aldehyde, having a molecular weight of at least 500,
B. A polymeric ester of a thiodialkanoic acid and a polyhydric alcohol, having a molecular weight of at least 500, and
C. Oxalic acid bis(benzylidene hydrazide) or adipic acid bis(acetyl hydrazide), which functions as an inhibitor against copper-induced degradation, in exceptionally stable in such use.

The polymer employed in the invention can be either high density polyethylene, crystalline polypropylene or a crystalline copolymer of at least 75% by weight propylene and up to 25% by weight of another olefin such as ethylene. The preferred copolymers are block copolymers in which a polypropylene segment is joined to a segment of polyethylene or to a segment of ethylene—propylene copolymer. All such polymers are well known in the art.

The terpene-phenol resins useful in the invention are resinous condensation products of a terpene and a phenol having a molecular weight of at least 400. The resins may be prepared by reacting various terpenes such as dipentene, pinene, limonene and various turpentine cuts with phenols, such as phenol, cresol, alkylated phenols, for example, normal butyl phenol, tertiary butyl phenol, propyl phenol and the like, in the presence of a catalyst such as sulfuric acid, sulfonic acid, aluminum chloride, boron trifluoride or the molecular compounds of boron trifluoride with ethers, acids, alcohols and phenols as described in U.S. Pat. No. 2,343,845, the disclosure of which is incorporated herein by reference. While the terpene-phenol resin may be produced by reacting as much as five parts of terpene with one part of phenol, resins preferred are those produced by reacting the terpene and phenol in the proportion of about 1-2 moles of the terpene per mole of phenol.

The A-stage phenol-formaldehyde resins used as antioxidants in this invention are those produced by the reaction of a para-substituted alkylphenol with formaldehyde in the presence of a suitable catalyst, such as oxalic acid, by procedures which are well known in the plastics art. Among the para-substituted alkylphenols which can be used in producing the suitable A-stage resins by reaction with formaldehyde are those in which the alkyl group contains from 4 to about 20 carbon atoms or more preferably from 4 to about 10 carbon atoms, such as para-tertiary butylphenol, para-tertiary amylphenol, para-tertiary heptylphenol, para-n-octylphenol, para-tertiary nonylphenol and the like.

Illustrative of the A-stage resins that can be used to control the oxidative degradation of polypropylene are para-tertiary butylphenol—formaldehyde resin, para-tertiary amylphenol—formaldehyde resin, para-n-octylphenol—formaldehyde resin, para-tertiary nonylphenol—formaldehyde resin, para-tertiary dodecylphenol—formaldehyde resin and the like. Also, mixtures of two or more alkylphenol—formaldehyde resins can be employed.

The thiodialkanoate polyesters useful in the invention have an average molecular weight of at least 500 and a formula selected from the group consisting of first, second and third formulas as follows:

(I) 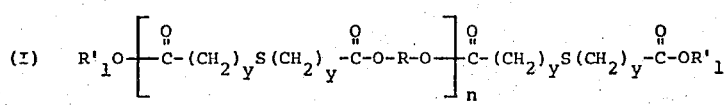

(II) 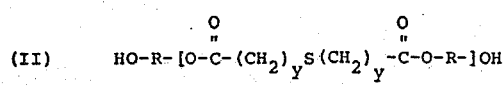

(III) 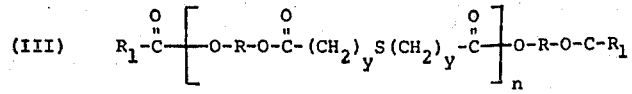

wherein $n$ is an integer of at least 1, $y$ is an integer of from 2 to 3, each $R_1$ is a member selected from the group consisting of a hydrogen atom, an alkyl radical having from 1 to 24 carbon atoms, a cycloalkyl radical having from 4 to 24 carbon atoms, an aryl radical of the benzene series having from 6 to 24 carbon atoms, and an aralkyl radical of the alkylated benzene series containing from 7 to 24 carbon atoms, each $R'_1$ is a member selected from the group consisting of an —ROH radical and $R_1$ members, and each R is a divalent radical containing from 2 to 18 carbon atoms, an arylenedimethylene radical containing from 8 to 12 carbon atoms, a cycloalkylenedimethylene radical containing from 6 to 18 carbon atoms, a —$CH_2$—$[O$—$(-CH_2-)_z-]O$—$CH_2$— radical, and a —$CH_2$—$[S$—$(-CH_2-)_z-]_xS$—$CH_2$— radical, $x$ being an integer from 1 to 20 and $z$ being an integer of from 2 to 6. These polymeric esters are more fully described in U.S. Pat. No. 3,157,517. The preferred polymeric esters are those made by reaction of thiodipropionic acid with glycol, such as ethylene glycol or cyclohexane dimethanol, optionally with a small amount of a monohydric alcohol such as stearyl alcohol.

Oxalic acid bis(benzylidene hydrazide) and adipic acid bis(acetyl hydrazide) are known copper inhibitors for polyolefins but their attribute of being resistant to extraction by petroleum jelly has been hitherto unrecognized.

The composition of the invention desirably contains the stabilizing components in amounts within the following ranges per each one hundred parts by weight of polymer:

| | |
|---|---|
| Phenolic antioxidant | 0.1 to 1.5 parts |
| Polymeric ester | 0.1 to 1.0 part |
| Oxalic acid bis-(benzylidene hydrazide) | 0.02 to 0.50 part |

The composition of the invention is useful as insulation in the presence of petroleum jelly of either high or low oil content. In such environment, the composition is capable of retaining stability for an indeterminate number of years, whereas related compositions containing conventional stabilizers deteriorate in but a few months.

The composition of the invention is illustrated in the following examples in which parts are by weight unless otherwise specified.

EXAMPLES 1-3

Compositions according to the invention and other compositions to serve as controls were prepared by compounding a crystalline copolymer of propylene and ethylene with selected additives, and then extruding and compounding to form molding powder.

The ingredients employed were as follows:

Polymer — a crystalline block copolymer of 78 weight percent propylene and 22 weight per cent ethylene.

Phenolic Antioxidants According to the Invention
A. "Nirez V-2040" — a polymeric terpene-phenol resin prepared by acid catalyzed reaction of 3 moles of alpha-pinene and 2 moles of phenol, having a molecular weight of 512.
B. "Amberol ST137X" — an A-stage phenol—formaldehyde reaction product made by condensing 5 moles of n-octylphenol with 4 moles of formaldehyde in the presence of an acid catalyst, having a molecular weight of about 1,000.

Conventional Phenolic Antioxidant
"Topanol CA," a trisphenol prepared by condensing 3 moles of 3-methyl-6-t-butylphenol with 1 mole of crotonaldehyde.

Polymeric Ester
Polyester having molecular weight of about 2,000 prepared by condensing thiodipropionic acid and mixtures of cyclohexanedimethanol and stearyl alcohol.

Conventionl Thiodipropionate Stabilizer
Distearyl thiodipropionate (DSTDP

Oxalic Acid Bis(Benzylidene Hydrazide) — (OABH)

Adipic Acid Bis(Acetyl Hydrazide) — (AABH)

Conventional Copper Inhibitor
Oxanilide

The extractability of the various stabilizers is determined by compounding the stabilizer into the polymer and compression molding the polymer into a 10 mil film. A portion of this film 1½ × 1 inch is placed in 50 ml. of petroleum jelly and treated for 18 hours at 85°C. (jelly to polymer ratio = about 175 to 1). The film is then removed from the petroleum jelly and wiped substantially clean. A qualitative measure can be obtained by means of a 180° DTA induction time. A quantitative measure can be obtained by infrared or U.V. analysis before and after the extraction.

The induction time is determined on a Perkin-Elmer Differential Scanning Calorimeter by heating the film on a previously oxidized copper surface at 180°C. in an oxygen atmosphere. The energy response of the specimen is plotted as a function of time and the time is recorded at which the initial exotherm occurs in the curve. This time is the induction time. To be commercially acceptable, a formulation should have an induction time of at least about 15 minutes.

The formulations of the examples and controls are given in the following table, along with the test results. Calcium stearate is included in all compositions as an antacid but its presence does not affect the test results. .90

EXAMPLES 4 and 5

The invention was demonstrated using high density polyethylene as the polymer. The data follow:

| | Example No. | |
|---|---|---|
| Ingredients | 4 | 5 |
| High density polyethylene | 100 g | 100 g |
| Calcium stearate | 0.10 | 0.10 |
| Terpene phenol resin | 1.00 | 0.50 |
| Polmeric ester | 0.40 | 0.20 |
| OABH | 0.10 | 0.10 |
| DTA Induction Time 180°C. on Copper | 55 | 40 |
| % Residual phenolic antioxidant | 75 | 75 |
| % Residual polymeric ester | 90 | 80 |

What I claim and desire to protect by Letters Patent is:

1. A polymer selected from the group consisting of high density polyethylene and crystalline polymers of propylene containing stabilizing amounts of the following additives:
A. from 0.1 to 1.5 parts per 100 parts of polymer (php) of a resonous condensation product of a terpene and phenol, having a molecular weight of at least 400, B. from 0.1 to 1.0 php of a polymeric ester of a thiodialkanoic acid and a polyhydric alcohol, having a molecular weight of at least 500, and C. from 0.02 to 0.5 php of oxalic acid bis(benzylidene hydrazide) or adipic acid bis(acetyl hydrazide).

2. The composition of claim 1 in which the polymer is a crystalline copolymer of propylene and ethylene.

3. The composition of claim 1 in which the polymer is propylene.

4. The composition of claim 1 in which the polymer is high density polyethylene.

* * * * *

UNITED STATES PATENT OFFICE
CERTIFICATE OF CORRECTION

Patent No. 3,864,431   Dated February 4, 1975

Inventor(s) Donald E. Reid

It is certified that error appears in the above-identified patent and that said Letters Patent are hereby corrected as shown below:

Column 4, line 42 of Printed Patent; Table on page 9 of Spec.,

--The table on page 9 of Specification was completely omitted except the last number "90".

(see attachment)

Signed and sealed this 22nd day of April 1975.

(SEAL)
Attest:

RUTH C. MASON
Attesting Officer

C. MARSHALL DANN
Commissioner of Patents
and Trademarks